INVENTOR
W.H. BRIGGS

Patented Sept. 7, 1948

2,448,701

UNITED STATES PATENT OFFICE 2,448,701

VEHICLE STEERING MECHANISM

Walter Henry Briggs, Birmingham, England, assignor to Burman & Sons Limited, Birmingham, England Application October 8, 1946, Serial No. 701,868
In Great Britain November 6, 1945

2 Claims. (Cl. 74—500)

This invention relates to vehicle steering mechanisms of the kind by which motion can be transmitted to linkage associated with the steerable road wheels from a rotary shaft operable by the driver, through a unit comprising a helically grooved member rotatable by the said shaft, and a lever in engagement with the said member, the object of the invention being to provide improved means for interconnecting the said member and the lever.

In the accompanying sheet of explanatory drawings—

Figure 1:
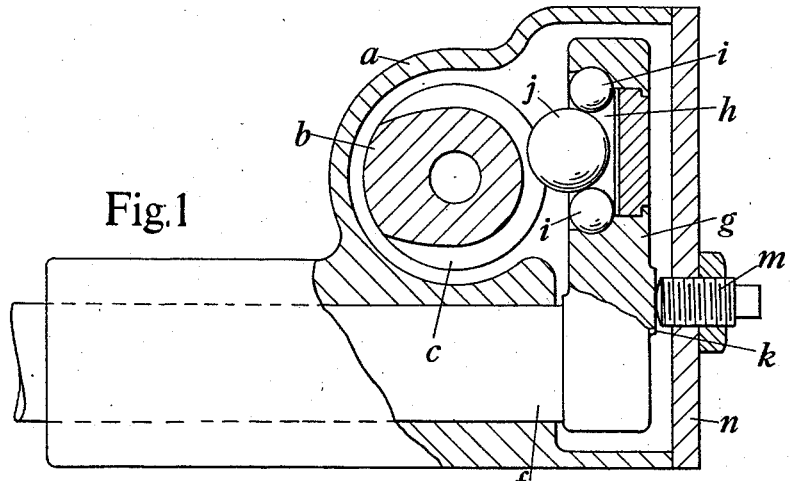
Figure 1 is a part sectional end view, and Figure 2 a side view (with a cover plate removed), of a vehicle steering mechanism embodying the invention.
Figure 2:
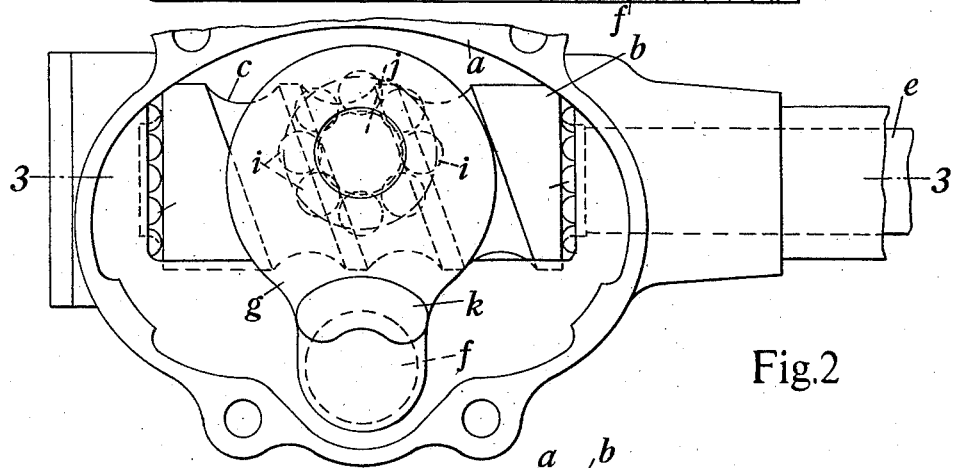
Figure 3:
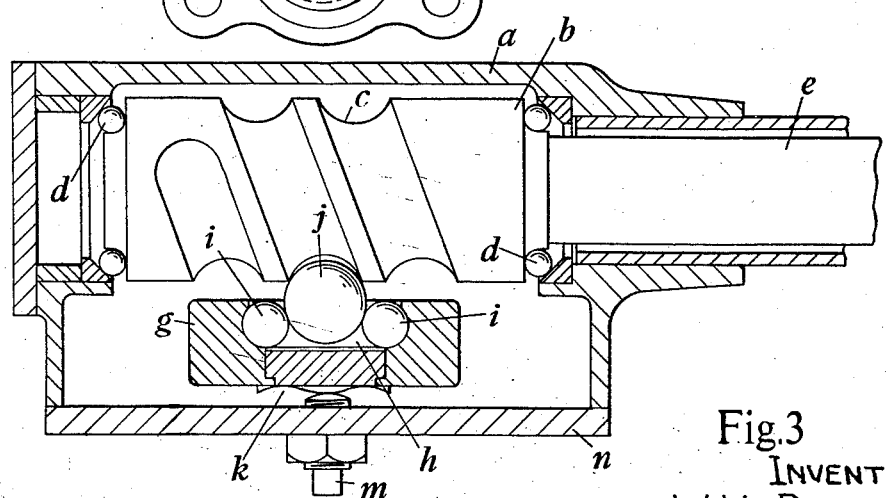
Figure 3 is a sectional plan taken on the line 3—3 of Figure 2.

In carrying the invention into effect as shown, I mount in a housing $a$ a rotatable cylindrical member $b$ having a helical groove $c$ formed on its outer surface, the groove being of substantially semicircular cross section. The helically grooved member $b$ is suitably supported at its ends by bearings $d$ in the housing $a$, and is formed on or secured to the lower end of the steering shaft $e$. Also in the housing $a$ is mounted with its axis at right angles to the axis of the helically grooved member $b$ a rock-shaft $f$ for transmitting motion to the linkage associated with the steerable road wheels, the rock-shaft having formed on or secured to one of its ends a lever $g$ which is arranged alongside the helically grooved member.

For interconnecting the helically grooved member $b$ and the lever $g$, I arrange in a circular recess $h$ in the outer end of the lever, a ring of balls $i$ which serve to support a single ball $j$ of substantially larger diameter, the latter ball being in engagement with the groove $c$ in the said member. The diameter of the single ball $j$ and the shape of the groove $c$ are preferably such that the ball does not bed on the base of the groove, but bears against its opposite sides at positions adjacent to the outer surface of the helically grooved member $b$. Also the arrangement is such that the line of pressure between the single ball $j$ and either side of the groove $c$ passes through the centre of this ball and a position which lies within the circle containing the centres of the supporting balls $i$.

When the helically grooved member $b$ is rotated by the driver, the single ball $j$ travels along the groove $c$ and so imparts an angular movement to the lever $g$ and rock-shaft $f$, but as the points of contact between the ball and groove move along an arcuate path, it is necessary to hold the ball in constant uniform contact with the groove. To satisfy this condition I provide on the outer side of the lever $g$ and in any convenient position (preferably near the axis of the rock-shaft $f$) a cam-shaped track $k$ which bears against an adjustably fixed abutment, the latter being conveniently formed by the inner end of an adjustable screw $m$ which extends through a cover plate $n$ closing one side of the housing $a$. Alternatively the cam-shaped track may be provided on the end of the screw and adapted to co-operate with a projection on the outer side of the lever. Preferably I arrange that when the lever $g$ is in its central position the single ball $j$ occupies a position a little above the plane containing the central axis of the helically grooved member $b$, so that the ball approaches that plane when the lever is moved to either side of its central position. The arrangement is such that when the lever $g$ is in its central position it is held by the crown of the cam-shaped track $k$, and when the lever is moved to either side of its central position the track permits sufficient endwise movement of the rock-shaft $f$ to maintain constant pressure between the single ball $j$ and the groove $c$.

By this invention I am able to provide a steering mechanism of the kind specified in a form which is both simple and robust, and also has a minimum of frictional resistance to movement. The invention is not, however, limited to the example described as subordinate constructional details may be varied to suit different requirements.

Having thus described my invention, what I claim as new and desire to secure by Letters Patent is:

1. A vehicle steering mechanism of the kind specified, having in combination a helically grooved cylindrical member, a rock shaft arranged at right angles to said member, a lever on said rock shaft, a single ball engaging the groove in said member, a ring of balls carried by said lever and supporting said single ball, a fixed member, and a relatively adjustable cam-shaped track and abutment arranged between said lever and fixed member so as to cause said lever to hold said single ball in constant uniform contact with said groove.

2. A vehicle steering mechanism as claimed in claim 1, in which the diameter of said single ball and the shape of said groove are such that said single ball does not bed on the base of said groove, but bears against its opposite sides at positions adjacent to the outer surface of said helically grooved member, the balls being arranged so that the line of pressure between said single ball and either side of said groove passes through the centre of said single ball and a position which lies within a circle passing through the centres of the supporting balls.

WALTER HENRY BRIGGS.

REFERENCES CITED

The following references are of record in the file of this patent:

UNITED STATES PATENTS

| Number | Name | Date |
|---|---|---|
| 1,725,737 | Noble | Aug. 20, 1929 |
| 1,995,239 | Bishop | Mar. 19, 1935 |
| 2,012,028 | Twyman | Aug. 20, 1935 |

FOREIGN PATENTS

| Number | Country | Date |
|---|---|---|
| 352,415 | Great Britain | July 7, 1931 |